(12) United States Patent
Sato et al.

(10) Patent No.: US 11,232,913 B2
(45) Date of Patent: Jan. 25, 2022

(54) ELECTROLYTIC CAPACITOR

(71) Applicant: PANASONIC INTELLECTUAL PROPERTY MANAGEMENT CO., LTD., Osaka (JP)

(72) Inventors: Masahiro Sato, Kyoto (JP); Kouta Muneyasu, Osaka (JP); Hiroshi Takeda, Kyoto (JP); Mina Sato, Kyoto (JP); Junji Kojima, Kyoto (JP); Yuichiro Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 67 days.

(21) Appl. No.: 16/471,369

(22) PCT Filed: Jan. 12, 2018

(86) PCT No.: PCT/JP2018/000718
§ 371 (c)(1),
(2) Date: Jun. 19, 2019

(87) PCT Pub. No.: WO2018/131691
PCT Pub. Date: Jul. 19, 2018

(65) Prior Publication Data
US 2019/0333705 A1    Oct. 31, 2019

Related U.S. Application Data

(60) Provisional application No. 62/445,767, filed on Jan. 13, 2017, provisional application No. 62/445,768, (Continued)

(51) Int. Cl.
*H01G 9/10* (2006.01)
*H01G 9/008* (2006.01)
(Continued)

(52) U.S. Cl.
CPC ............... *H01G 9/10* (2013.01); *H01G 9/008* (2013.01); *H01G 9/025* (2013.01); *H01G 9/042* (2013.01); *H01G 9/07* (2013.01); *H01G 9/15* (2013.01)

(58) Field of Classification Search
CPC .......... H01G 9/10; H01G 9/008; H01G 9/025; H01G 9/042; H01G 9/07; H01G 9/15;
(Continued)

(56) References Cited

U.S. PATENT DOCUMENTS 6,442,014 B1    8/2002   Lin
2007/0171598 A1 7/2007   Ishizuka et al.
(Continued)

FOREIGN PATENT DOCUMENTS

CN    2729959 Y    9/2005
CN    1937217 A    3/2007
(Continued)

OTHER PUBLICATIONS

International Search Report and Written Opinion issued in International Patent Application No. PCT/JP2018/000718, dated Mar. 20, 2019; with partial English translation.
(Continued)

*Primary Examiner* — Michael P McFadden
(74) *Attorney, Agent, or Firm* — McDermott Will and Emery LLP

(57) ABSTRACT

Provided is an electrolytic capacitor including: a capacitor element including an anode body, a dielectric layer formed on the anode body, a solid electrolyte layer formed on the dielectric layer, and a cathode layer formed on the solid electrolyte layer; lead terminals each connected to the anode body and the cathode layer; and a packaging member covering at least part of the capacitor element. The packaging member includes a side wall that is electrically conduc-
(Continued)

tive, and a bottom face, with at least one of the lead terminals partially exposed from the bottom face. An insulating member is interposed between a first end of the side wall and the lead terminal exposed from the bottom face, the first end being near the bottom face.

12 Claims, 14 Drawing Sheets

Related U.S. Application Data filed on Jan. 13, 2017, provisional application No. 62/457,222, filed on Feb. 10, 2017.

(51) Int. Cl.
  *H01G 9/025* (2006.01)
  *H01G 9/042* (2006.01)
  *H01G 9/07* (2006.01)
  *H01G 9/15* (2006.01)

(58) Field of Classification Search
  CPC .......... H01G 9/02; H01G 9/045; H01G 9/145; H01G 2009/0408; H01G 4/35; H01G 2/02; H01G 2/06; H01G 4/224; H01G 9/08; H01G 11/78; H01G 11/80; H01G 11/84
  See application file for complete search history.

(56) References Cited

U.S. PATENT DOCUMENTS

| | | | |
|---|---|---|---|
| 2008/0130201 A1 | 6/2008 | Kodera | |
| 2008/0198535 A1 | 8/2008 | Kuriyama | |
| 2010/0119934 A1* | 5/2010 | Ushio | H01G 9/155 |
| | | | 429/163 |
| 2012/0257328 A1 | 10/2012 | Zednicek et al. | |
| 2012/0257329 A1 | 10/2012 | Biler et al. | |
| 2015/0179349 A1 | 6/2015 | Biler et al. | |
| 2015/0332857 A1* | 11/2015 | Ishimaru | H01G 9/06 |
| | | | 361/524 |
| 2016/0181020 A1* | 6/2016 | Weaver | H01G 9/15 |
| | | | 361/509 |

FOREIGN PATENT DOCUMENTS

| | | | |
|---|---|---|---|
| CN | 1971787 A | | 5/2007 |
| CN | 101197213 A | | 6/2008 |
| CN | 102737855 A | | 10/2012 |
| CN | 105047413 A | | 11/2015 |
| CN | 105047414 A | | 11/2015 |
| JP | H08-148386 A | | 6/1996 |
| JP | 2007-103575 A | | 4/2007 |
| JP | 2007103575 A | * | 4/2007 |
| JP | 2007-200950 A | | 8/2007 |
| JP | 2007-201382 A | | 8/2007 |
| JP | 2008-117901 A | | 5/2008 |
| JP | 2012-222342 A | | 11/2012 |
| TW | 502859 U | | 9/2002 |
| WO | 2005/086193 A1 | | 9/2005 |

OTHER PUBLICATIONS

Chinese Office Action issued in the corresponding Chinese Patent Application No. 201880004490.9, dated Sep. 22, 2020; with partical English translation.

Chinese Office Action issued in corresponding Chinese Patent Application No. 201880004490.9, dated Mar. 30, 2021; with partial English translation.

Chinese Office Action issued in the corresponding Chinese Patent Application No. 201880004490.9, dated Sep. 14, 2021; with partial English translation.

* cited by examiner

ELECTROLYTIC CAPACITOR

CROSS-REFERENCE OF RELATED APPLICATIONS

This application is the U.S. National Phase under 35 U.S.C. § 371 of International Patent Application No. PCT/JP2018/000718, filed on Jan. 12, 2018, which in turn claims the benefit of U.S. Provisional Application No. 62/445,767, filed on Jan. 13, 2017, U.S. Provisional Application No. 62/445,768, filed on Jan. 13, 2017 and U.S. Provisional Application No. 62/457,222, filed on Feb. 10, 2017, the entire disclosures of which Applications are incorporated by reference herein.

TECHNICAL FIELD

The present invention relates to an electrolytic capacitor, specifically to an electrolytic capacitor that includes a packaging member covering a capacitor element.

BACKGROUND ART

Electrolytic capacitors, which have low equivalent series resistance (ESR) and excellent frequency characteristics, are used in various electronic devices. A typical electrolytic capacitor includes a capacitor element having electrodes, lead terminals each electrically connected to the electrodes, and a packaging member covering at least part of the capacitor element.

Patent Literature 1 uses a metal case as the packaging member. The metal case is provided with a notch. The lead terminal is inserted through the notch.

CITATION LIST

Patent Literature

[PTL 1] Japanese Laid-Open Patent Publication No. 2007-103575

SUMMARY OF INVENTION

Technical Problem

In Patent Literature 1, short-circuiting may occur between the metal case and the lead terminal.

Solution to Problem

A first aspect of the present invention relates to an electrolytic capacitor including: a capacitor element including an anode body, a dielectric layer formed on the anode body, a solid electrolyte layer formed on the dielectric layer, and a cathode layer formed on the solid electrolyte layer; lead terminals each connected to the anode body and the cathode layer; and a packaging member covering at least part of the capacitor element. The packaging member includes a side wall that is electrically conductive, and a bottom face, with at least one of the lead terminals partially exposed from the bottom face. An insulating member is interposed between a first end of the side wall and the lead terminal exposed from the bottom face, the first end being near the bottom face.

A second aspect of the present invention relates to an electrolytic capacitor including: a capacitor element including an anode body, a dielectric layer formed on the anode body, a solid electrolyte layer formed on the dielectric layer, and a cathode layer formed on the solid electrolyte layer; lead terminals each connected to the anode body and the cathode layer; and a packaging member covering at least part of the capacitor element. The packaging member includes a side wall that is electrically non-conductive, and a bottom face, with at least one of the lead terminals partially exposed from the bottom face.

Advantageous Effects of Invention

According to the present invention, short-circuiting between the packaging member and the lead terminal can be prevented.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
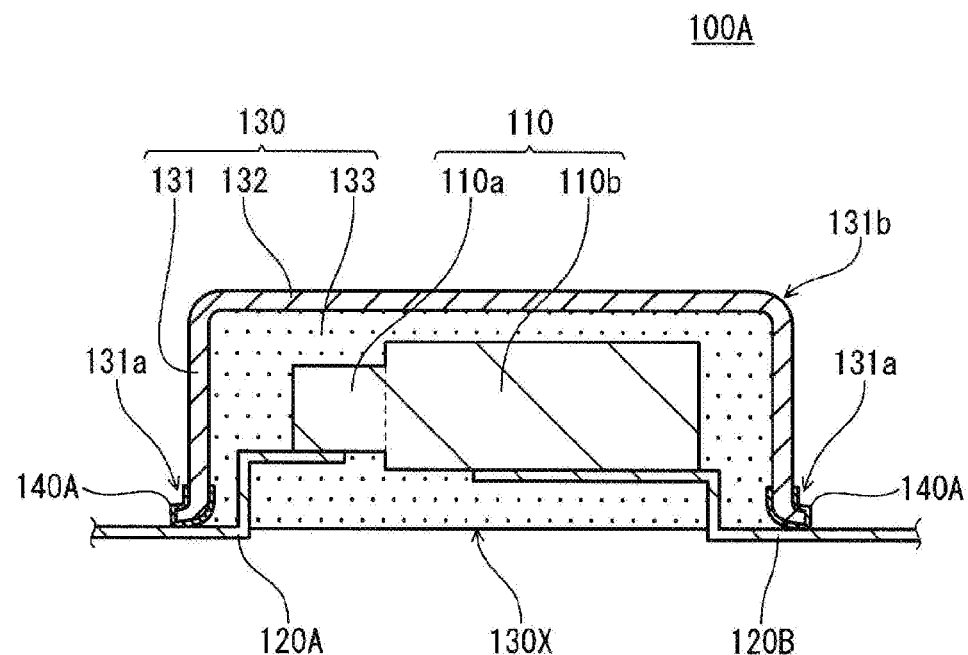
FIG. 1 A schematic cross-sectional view of an electrolytic capacitor according to a first embodiment of a first mode of the present invention.

Electrical insulation between the packaging member and the lead terminal(s) can be implemented according to the following two modes.

A. First Mode

The first mode is an electrolytic capacitor including: a capacitor element including a dielectric layer formed on an anode body, a solid electrolyte layer formed on the dielectric layer, and a cathode layer formed on the solid electrolyte layer; lead terminals each connected to the anode body and the cathode layer; and a packaging member covering at least part of the capacitor element. The packaging member includes a side wall that is electrically conductive, and a bottom face, with at least one of the lead terminals partially exposed therefrom. An insulating member is interposed between a first end of the side wall, the end near the bottom face, and the lead terminal exposed from the bottom face.

In the present embodiment, the side wall of the packaging member has electrical conductivity. The lead terminal(s) (hereinafter referred to as "first lead terminal") exposed from the bottom face of the electrolytic capacitor extends across the side wall to outside the packaging member. Note that the insulating member is interposed between the first end near the bottom face of the side wall and the first lead terminal. The insulating member prevents the contact between the first end and the first lead terminal. Therefore, short-circuiting between the packaging member (side wall) and the first lead terminal can be prevented. The first lead terminal may be an anode lead terminal connected to the anode body, or a cathode lead terminal connected to the cathode layer, or the anode and cathode lead terminals.

B. Second Mode

The second mode is an electrolytic capacitor including: a capacitor element including a dielectric layer formed on an anode body, a solid electrolyte layer formed on the dielectric layer, and a cathode layer formed on the solid electrolyte layer; lead terminals each connected to the anode body and the cathode layer; and a packaging member covering at least part of the capacitor element. The packaging member includes a side wall that is electrically non-conductive, and a bottom face, with at least one of the lead terminals partially exposed therefrom.

In the present embodiment, the side wall of the packaging member has electrical non-conductivity. The lead terminal(s) (hereinafter referred to as "first lead terminal") exposed from the bottom face of the electrolytic capacitor extends across the side wall to outside the packaging member. Note that the side wall is electrically non-conductive. Therefore, short-circuiting between the packaging member (side wall) and the first lead terminal can be prevented. The first lead terminal may be an anode lead terminal connected to the anode body, or a cathode lead terminal connected to the cathode layer, or the anode and cathode lead terminals.

The electrolytic capacitor will be mounted, for example, on an electronic component such as a pattern-printed circuit board. The bottom face from which the lead terminal is exposed will be a mounting face on the electronic component. The side wall will be a face intersecting with the bottom face of the electrolytic capacitor, positioned so as to rise from the electronic component. The side wall is a plate-like member having an inner surface and an outer surface.

The first end comprises: an inside region that is part of the inner surface of the side wall, formed along the side facing the bottom face; an outside region that is part of the outer surface of the side wall, formed along the side facing the bottom face; and an end face of the side wall (first end face) bridging the inside region and the outside region. The inside region occupies, for example, 30% in area of the inner surface of the side wall. The outside region occupies, for example, 30% in area of the outer surface of the side wall.

Each of the modes will be described in detail.

A. First Mode

In the present mode, the side wall of the packaging member has electrical conductivity.

Any material can be used as the side wall, as long as it is electrically conductive. For example, a metal material can be used. Examples of the metal material include aluminum, titanium, tantalum, iron, copper, zinc, nickel, molybdenum, tungsten, and composites of these materials. Since the side wall of the packaging member contains a metal material, permeation of oxygen and water into the electrolytic capacitor can be reduced, and deterioration of the capacitor element can be prevented.

Any material can be used as the insulating member. Examples thereof include resin (e.g., epoxy resin, phenol resin, polyester resin, melamine resin, polyimide resin), ceramics (e.g., aluminum oxide, zirconium dioxide, aluminum nitride, silicon nitride), rubber (e.g., styrene butadiene rubber, isoprene rubber, butadiene rubber, ethylene propylene rubber, urethane rubber, silicone rubber, fluorine rubber), glass, heat resistant paper, and composites of these materials.

In view of easily and reliably preventing short-circuiting between the packaging member and the first lead terminal, the first lead terminal and an end face of the packaging member (side wall) near the bottom face are preferably not flush with each other. When the electrolytic capacitor is mounted on an electronic component, the first lead terminal contacts the electronic component, while the packaging member does not contacts the electronic component. Therefore, even when the solder used for mounting the electrolytic capacitor on the electronic component spreads out, or the electrolytic capacitor becomes displaced or floated, short-circuiting between the packaging member and the electronic component will be unlikely to occur.

Embodiments of the first mode will be described below with reference to the appended drawings.

Embodiment I-1

In the present embodiment, the insulating member includes a resin film covering at least part of the first end.

The resin film may be a resin tape attached to the first end, or a resin coat applied on the first end, or a resin cap put on the first end. The thickness of the resin film is, for example, 1 μm or more and 300 μm or less, but not limited thereto.

An example of the present embodiment, an electrolytic capacitor 100A, is shown in FIG. 1.

A capacitor element 110 has an anode part 110a and a cathode part 110b. The anode part 110a comprises an anode body. An anode lead terminal 120A is connected to the anode body. The cathode part 110b includes a cathode layer. A cathode lead terminal 120B is connected to the cathode layer.

The capacitor element 110 is covered with a packaging member 130. The packaging member 130 includes a side wall 131, a ceiling 132, and a sealing resin 133. The ceiling 132 is disposed opposite to a bottom face 130X of the electrolytic capacitor 100A.

The sealing resin 133 is filled between the capacitor element 110 and the side wall 131 and between the capacitor element 110 and the ceiling 132. The capacitor element 110 is covered from all sides with the sealing resin 133. The outer peripheral surface of the sealing resin 133 is partially covered by the side wall 131 and the ceiling 132. From the remaining outer peripheral surface of the sealing resin 133, the anode lead terminal 120A and the cathode lead terminal 120B (hereinafter sometimes collectively referred to as "lead terminal 120") are each partially exposed. In other words, the bottom face 130X is formed of the sealing resin 133. The bottom face 130X may be provided with a protective layer having low permeability to at least one of oxygen and water, at a region where the lead terminal 120 is not exposed. The inner surface of the side wall 131 and the surface of the lead terminal 120 may be roughened. This enhances the adhesion with the sealing resin 133.

The sealing resin 133 is electrically non-conductive and includes, for example, a hardened material of thermosetting resin. Examples of the thermosetting resin include epoxy resin, phenol resin, silicone resin, melamine resin, urea resin, alkyd resin, polyurethane, polyimide, polyamide-imide, and unsaturated polyester. The sealing resin 133 can reduce permeation of oxygen and water into the electrolytic capacitor. Thus, the deterioration of the capacitor element can be prevented, and the heat insulating properties thereof can be improved.

The packaging member 130 is approximately a rectangular parallelepiped in shape. The side wall 131 and the ceiling 132 are integrally formed by, for example, integral molding. The method of integrally molding the side wall 131 and the ceiling 132 is, for example, sheet metal drawing. It is not easy, however, to form a metal sheet having resin film into a prismatic shape by drawing. Therefore, when sheet metal drawing is used to integrally form the side wall 131 and the ceiling 132, preferably, the resin film serving as the insulating member is provided after drawing at a predetermined position on the packaging member 130.

The ceiling 132 may be replaced with a lid member (not shown) which is a separate member from the side wall 131. In other words, the packaging member 130 may include the side wall 131, the sealing resin 133, and the lid member disposed near a second end 131b of the side wall 131, the end being opposite a first end 131a of the side wall 131 near the bottom face 130X. The lid member may or may not be electrically conductive. Examples of the material of the conductive lid member include those mentioned as examples of the material of the side wall. Examples of the material of the non-conductive lid member include those mentioned as examples of the material of the insulating member. The side wall 131 may be formed by cutting a tubular-shaped metal sheet having a rectangular cross-section to a predetermined length.

An insulating member 140A is interposed between the first end 131a of the side wall 131 and the anode lead terminal 120A and between the first end 131a and the cathode lead terminal 120B. The insulating member 140A includes a resin film formed on at least part of the first end 131a. The packaging member 130 is thus electrically insulated from the lead terminal 120. Furthermore, due to the presence of the insulating member 140A, the lead terminal 120 and the first end of the packaging member 130 are not flush with each other. This means that when the electrolytic capacitor 100A is mounted on an electronic component, the lead terminal 120 contacts the electronic component, while the packaging member 130 does not contact the electronic component. Therefore, short-circuiting between the packaging member 130 and the electronic component can also be prevented.

Embodiment I-2

In the present embodiment, the insulating member includes a resin film covering at least part of the first lead terminal.

The resin film may be a resin tape attached on the first lead terminal, or a resin coat applied on the first lead terminal, or a resin cap put on the first lead terminal. The thickness of the resin film is, for example, 1 μm or more and 300 μm or less, but not limited thereto.

Figure 2:
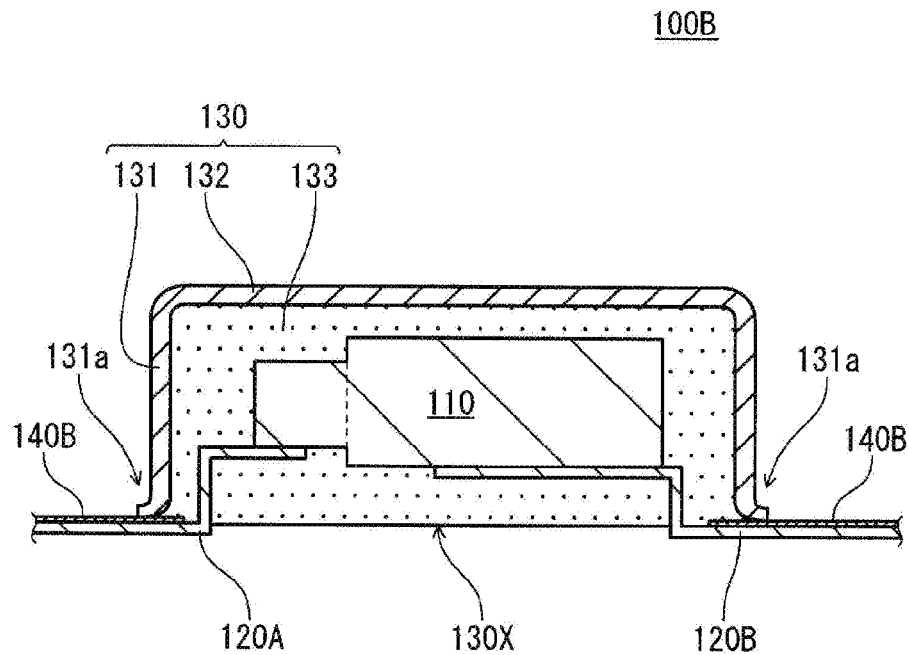
FIG. 2 A schematic cross-sectional view of an electrolytic capacitor according to a second embodiment of the first mode of the present invention.

An example of the present embodiment, an electrolytic capacitor 100B, is shown in FIG. 2.

The electrolytic capacitor 100B is configured similarly to the electrolytic capacitor 100A, except that an insulating member 140B includes a resin film covering at least part of the lead terminal 120. The electrolytic capacitor 100B may further include a resin film (insulating member 140A) formed on at least part of the first end 131a.

Embodiment I-3

In the present embodiment, the insulating member includes an oxide film of a first metal material, the metal material contained in the side wall. The first end is covered with the oxide film of the first metal material. The thickness of the oxide film is, for example, 10 nm or more and 10 μm or less, but not limited thereto. Examples of the first metal material include those mentioned as examples of the material of the side wall. A preferable material is a metal (valve metal) capable of forming a coating film having insulating properties. Preferably, the side wall is formed of aluminum (i.e., the first metal material is aluminum), and the insulating member includes an aluminum oxide film.

Figure 3:
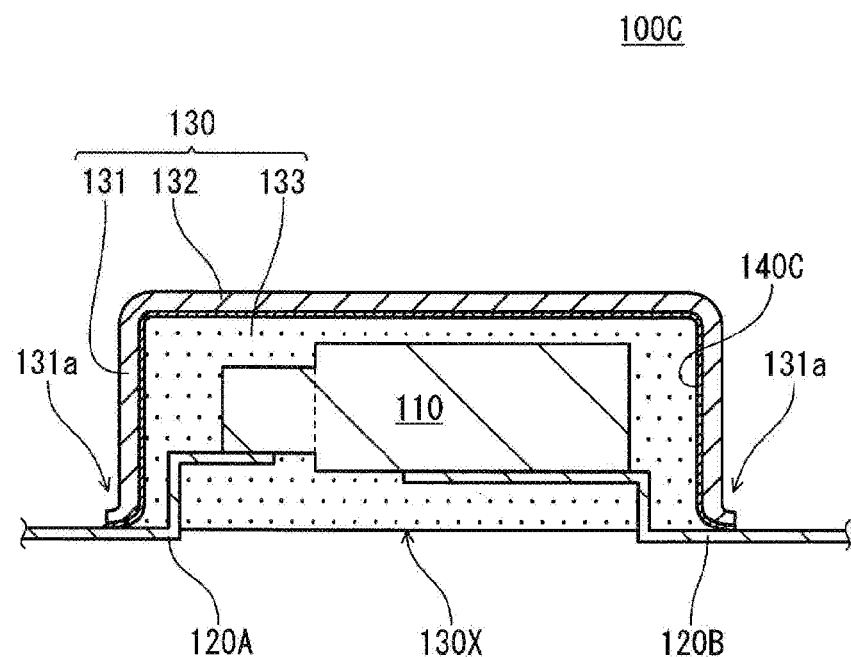
FIG. 3 A schematic cross-sectional view of an electrolytic capacitor according to a third embodiment of the first mode of the present invention.

An example of the present embodiment, an electrolytic capacitor 100C, is shown in FIG. 3.

The electrolytic capacitor 100C is configured similarly to the electrolytic capacitor 100A, except that an insulating member 140C includes an oxide film of the first metal material that covers at least part of the first end 131a. The oxide film (insulating member 140C) may cover the entire inner surfaces of the side wall 131 and the ceiling 132, as shown in FIG. 3. The oxide film (insulating member 140C) may further cover part of or the entire inner surfaces of the side wall 131 and the ceiling 132.

Embodiment I-4

In the present embodiment, the insulating member includes an oxide film of a second metal material, the metal material contained in the first lead terminal. The first lead terminal is covered with the oxide film of the second metal material. The thickness of the oxide film is, for example, 10 nm or more and 10 μm or less, but not limited thereto. Examples of the second metal material include those mentioned as examples of the material of the side wall. A preferable material is a metal (valve metal) capable of forming a coating film having insulating properties.

Figure 4:
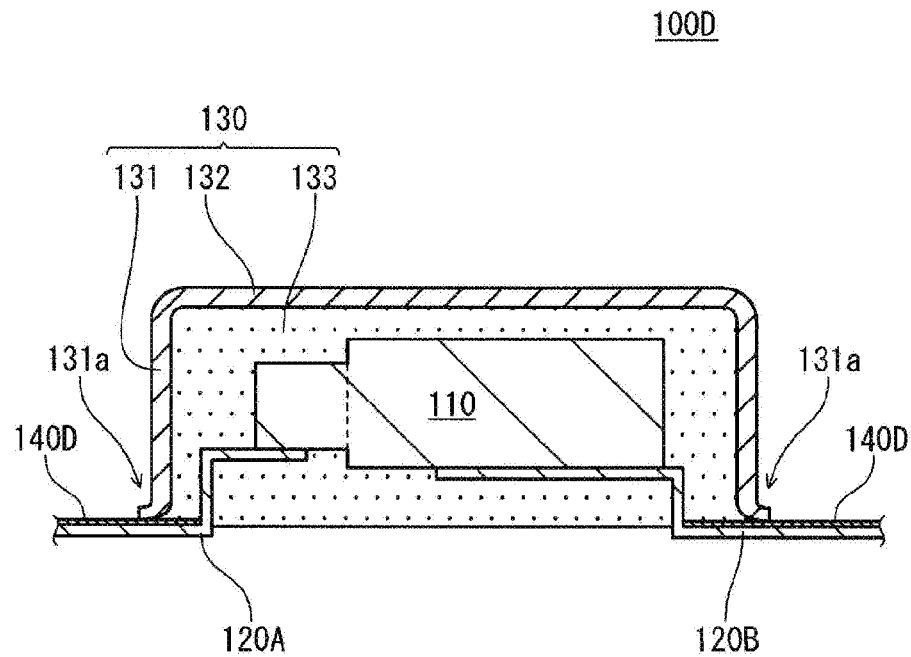
FIG. 4 A schematic cross-sectional view of an electrolytic capacitor according to a fourth embodiment of the first mode of the present invention.

An example of the present embodiment, an electrolytic capacitor 100D, is shown in FIG. 4.

The electrolytic capacitor 100D is configured similarly to the electrolytic capacitor 100A, except that an insulating member 140D includes an oxide film of the second metal material that covers at least part of the lead terminal 120. The oxide film covers the principle surface of the lead terminal 120, the surface opposite the bottom face 130X. The electrolytic capacitor 100D may further include the oxide film of the first metal material (insulating member 140C) that covers at least part of the first end 131a.

Embodiment I-5

In the present embodiment, the insulating member includes a plate-like member provided between the first end and the first lead terminal. The thickness of the plate-like member is, for example, 0.05 mm or more and 1 mm or less, but not limited thereto. The thickness may be 0.1 mm or more and 0.5 mm or less.

Figure 5:
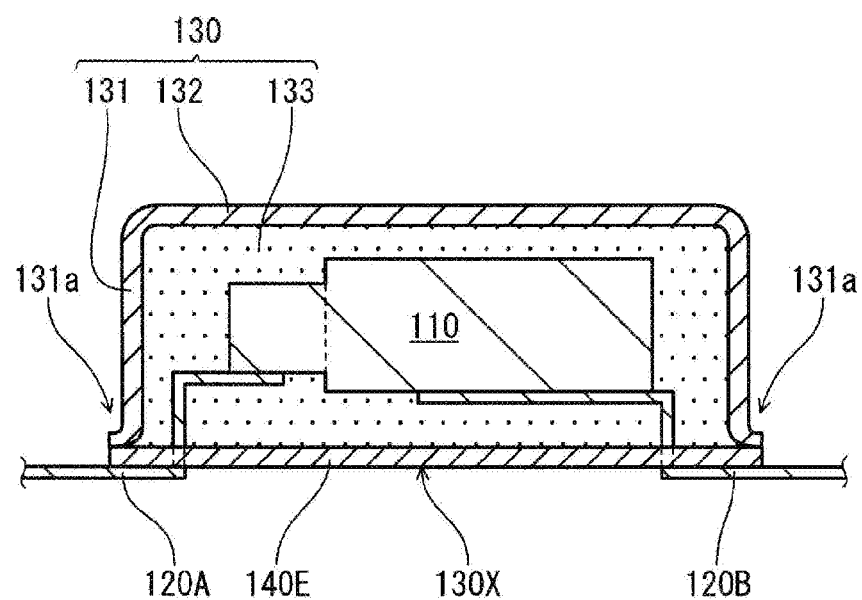
FIG. 5 A schematic cross-sectional view of an electrolytic capacitor according to a fifth embodiment of the first mode of the present invention.

An example of the present embodiment, an electrolytic capacitor 100E, is shown in FIG. 5.

The electrolytic capacitor 100E includes an insulating member 140E that includes a plate-like member provided between the first end 131a and the lead terminal 120. The plate-like member 140E has an opening for passing the lead terminal 120 therethrough. After having passed through the opening, the lead terminal 120 is bent and extends to outside. The outer peripheral surface of the sealing resin 133 is covered by the side wall 131, the ceiling 132, and the insulating member 140E. In other words, the bottom face 130X is formed of the insulating member 140E. Except these, the electrolytic capacitor 100E is configured similarly to the electrolytic capacitor 100A.

The insulating member 140E may or may not be joined to the side wall 131. When not joined to the side wall, the insulating member 140E is retained by the bent lead terminal 120.

FIGS. 6A to 6F show variations of the plate-like insulating member 140E.

Figure 6A:
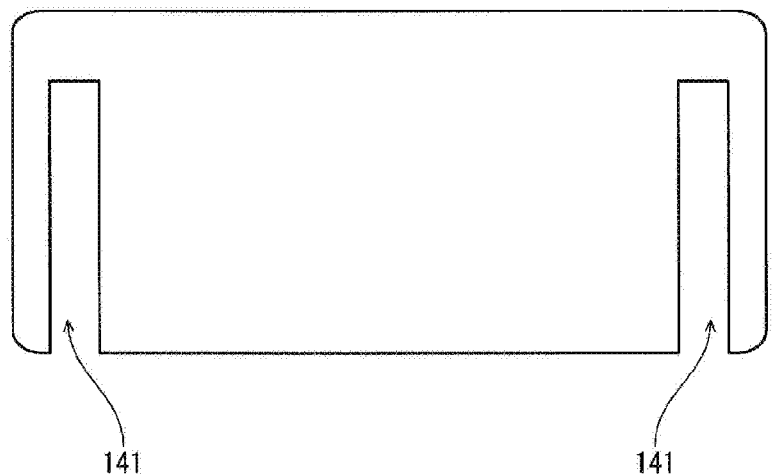
FIG. 6A A top view schematically showing an example of a plate-like member according to the fifth embodiment.

An insulating member 140EA of FIG. 6A has a slit-like opening 141. The opening 141 is provided according to the number of the lead terminals 120 to be exposed. The opening 141 may be of any size or area, as long as the lead terminal 120 can be inserted therethrough. The area of one opening 141 is, for example, 1% or more and 35% or less of that of the insulating member 140EA.

The opening 141 is open at one part. With the open part put to the lead terminal 120, the insulating member 140EA is slid. In this way, the insulating member 140EA can be easily placed between the first end 131a and the lead terminal 120. After the insulating member 140EA is placed at a predetermined position, the lead terminal 120 is bent along the bottom face 130X toward outside the electrolytic capacitor 100E.

Figure 6B:
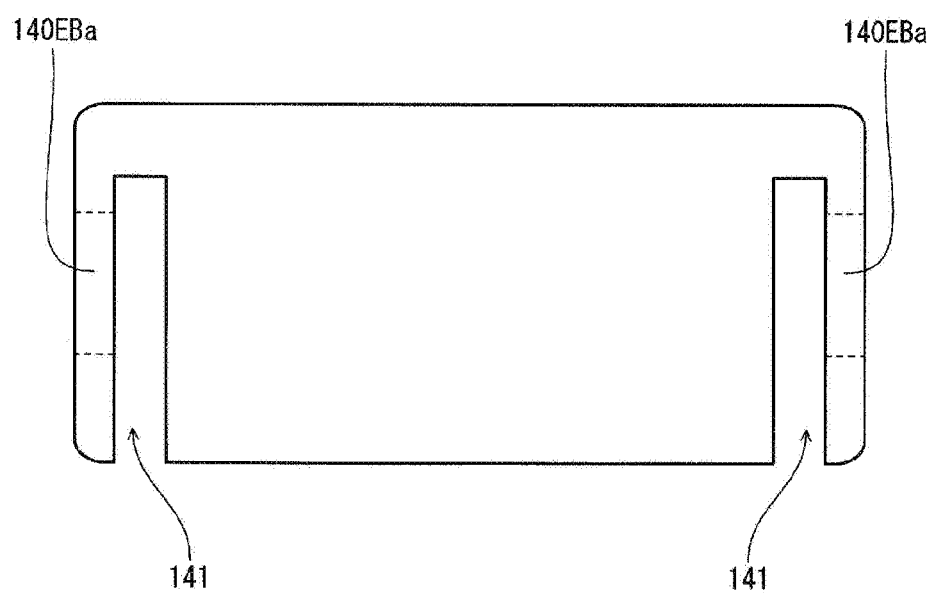
FIG. 6B A top view schematically showing another example of the plate-like member according to the fifth embodiment.

An insulating member 140EB of FIG. 6B also has the slit-like opening 141. The difference is that the insulating member 140EB is made thin at a region 140EBa around the opening 141 where the insulating member 140EB overlaps the bent lead terminal 120. This can reduce the height of the electrolytic capacitor 100E. The region 140EBa may be formed by, for example, partially cutting the insulating member 140EB. The thickness of the region 140EBa is, for example, 10% or more and 80% or less of that of the other region of the insulating member 140EB, but not limited thereto.

Figure 6C:
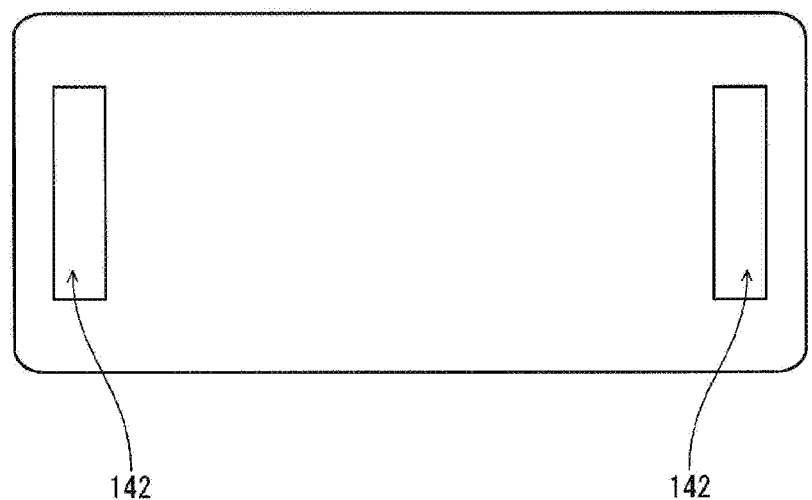
FIG. 6C A top view schematically showing another example of the plate-like member according to the fifth embodiment.

An insulating member 140EC of FIG. 6C has an opening 142 having no open part. The opening 142 is provided according to the number of the lead terminals 120 to be exposed. The opening 142 may be of any size or area, as long as the lead terminal 120 can be inserted therethrough. The size of one opening 142 may be, for example, 0.7% or more and 25% or less of the area of the insulating member 140EC. The lead terminal 120 is inserted into the opening 142, and thereby the insulating member 140E can be easily placed between the first end 131a and the lead terminal 120.

Figure 6D:
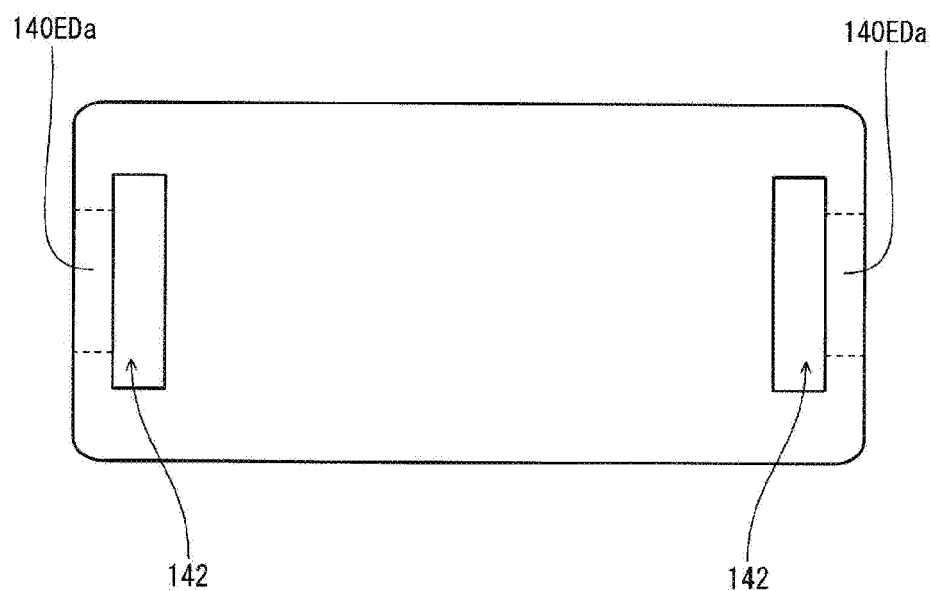
FIG. 6D A top view schematically showing another example of the plate-like member according to the fifth embodiment.

An insulating member 140ED of FIG. 6D also has the opening 142 similar to that of the insulating member 140EC. The difference is that the insulating member 140ED is made thin at a region 140EDa around the opening 142 where the insulating member 140ED overlaps the bent lead terminal 120. The thickness of the region 140EDa is, for example, 10% or more and 80% or less of that of the other region of the insulating member 140ED, but not limited thereto.

Figure 6E:
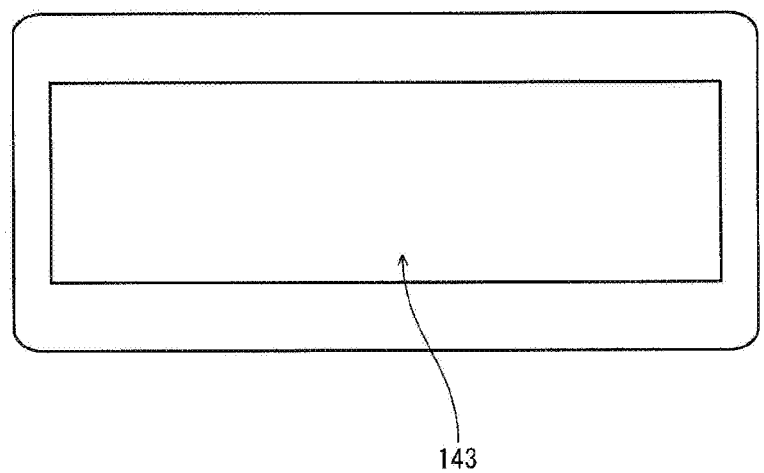
FIG. 6E A top view schematically showing another example of the plate-like member according to the fifth embodiment.

An insulating member 140EE of FIG. 6E has an opening 143, which also has no open part. The difference is that the opening 143 is larger in area than the opening 142, and two lead terminals 120 are inserted together into one opening 143. The opening 143 may be of any size, as long as two lead terminals 120 can be inserted therethrough. The size of the opening 143 may be, for example, 3% or more and 80% or less of the area of the insulating member 140EE.

Figure 6F:
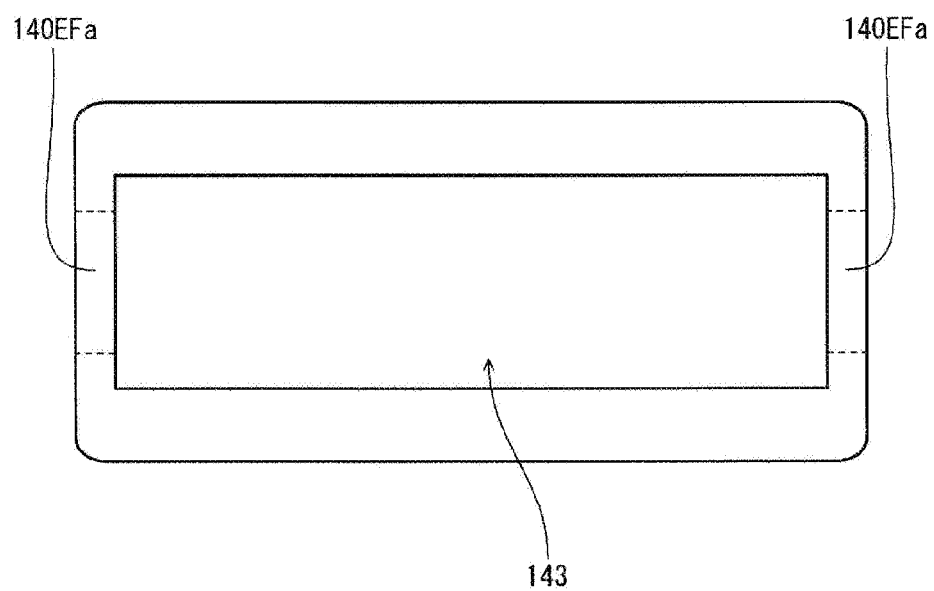
FIG. 6F A top view schematically showing another example of the plate-like member according to the fifth embodiment.

An insulating member 140EF of FIG. 6F also has the opening 143 similar to that of the insulating member 140EE. The difference is that the insulating member 140EF is made thin at a region 140EFa around the opening 143 where the insulating member 140EF overlaps the bent lead terminals 120. The thickness of the region 140EFa is, for example, 10% or more and 80% or less of that of the other region of the insulating member 140EF, but not limited thereto.

Embodiment I-6

In the present embodiment also, the insulating member includes a plate-like member provided between the first end and the first lead terminal. The difference is that the first lead terminal has a first portion connected to the anode body or the cathode layer, and a second portion exposed from the bottom face, with the second portion housed in the plate-like member. The plate-like member may be a ceramics multilayer printed circuit board produced by, for example, the HTCC (High Temperature Co-fired Ceramics) technology or the LTCC (Low Temperature Co-fired Ceramics) technology. The thickness of the plate-like member is, for example, 0.1 mm or more and 1 mm or less, but not limited thereto. The thickness may be 0.1 mm or more and 0.5 mm or less.

Figure 7A:
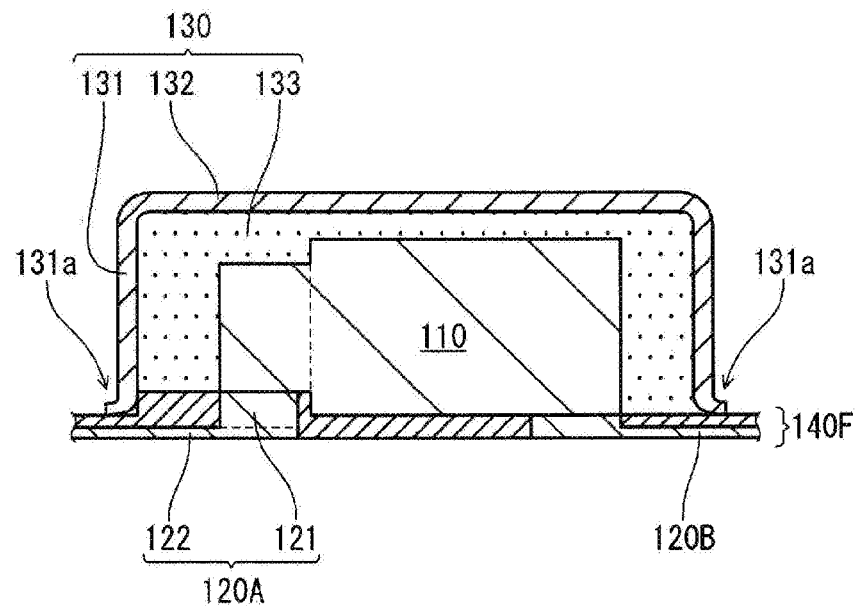
FIG. 7A A schematic cross-sectional view of an electrolytic capacitor according to a sixth embodiment of the first mode of the present invention.

An example of the present embodiment, an electrolytic capacitor 100F, is shown in FIG. 7A.

The electrolytic capacitor 100F is configured similarly to the electrolytic capacitor 100E, except that an insulating member 140F houses a second portion 122 of the anode lead terminal 120A. The insulating member 140F further houses a first portion 121.

The insulating member 140F is joined to the side wall 131. The joining is performed by, for example, using adhesive or low-melting glass, soldering, or brazing. When soldering or brazing is used for joining, on the insulating member 140F, for example, a metal pattern is provided in advance so as to correspond to the side wall 131. The gap between the capacitor element 110 and the side wall 131 may be filled with the sealing resin 133, or charged with atmospheric or inert gas. The gap between the capacitor element 110 and the side wall 131 may be in a reduced-pressure state.

Figure 7B:
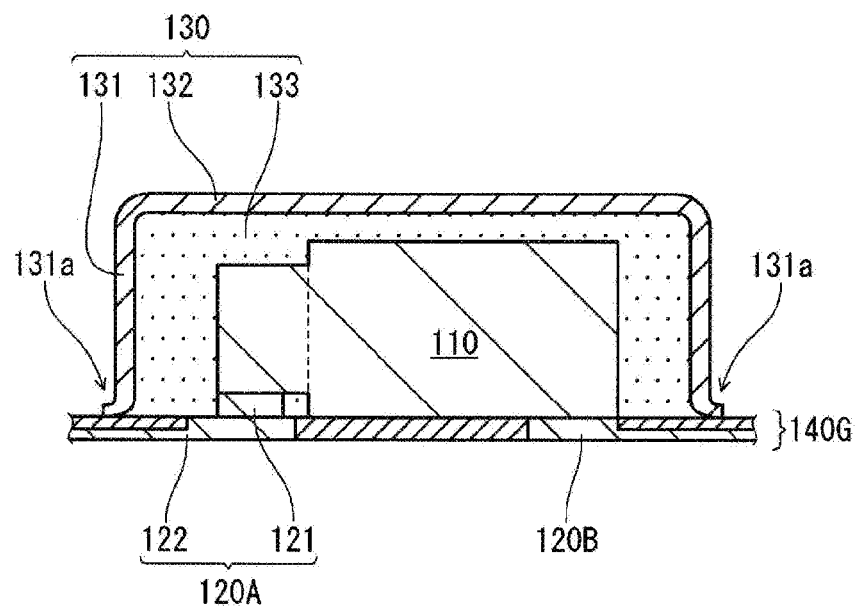
FIG. 7B A schematic cross-sectional view of another electrolytic capacitor according to the sixth embodiment of the first mode of the present invention.

The first portion 121 of the anode lead terminal 120A may not be housed in a sealing member 140G, like in an electrolytic capacitor 100G of FIG. 7B. The first portion 121 may be a separate member from the second portion 122 (insulating member 140G). In this case, the first portion 121 can be designed more freely in shape and size. This allows the use of various shapes and sizes of the capacitor elements 110. The electrolytic capacitor 100G is configured similarly to the electrolytic capacitor 100F, except that the first and second portions 121 and 122 of the anode lead terminal 120A are separate members, and the first portion 121 is not housed in the insulating member 140G.

Next, a second mode will be described.

B. Second Mode

In the present mode, the side wall of the packaging member has electrical non-conductivity.

Any material can be used as the side wall, as long as it is electrically non-conductive. Examples thereof include resin (e.g., epoxy resin, phenol resin, polyester resin, melamine resin, polyimide resin), ceramics (e.g., aluminum oxide, zirconium dioxide, aluminum nitride, silicon nitride), rubber (e.g., styrene butadiene rubber, isoprene rubber, butadiene rubber, ethylene propylene rubber, urethane rubber, silicone rubber, fluorine rubber), glass, heat resistance paper, and composites of these materials.

Embodiments of the second mode will be described below with reference to the appended drawings.

Embodiment II-1

Figure 8:
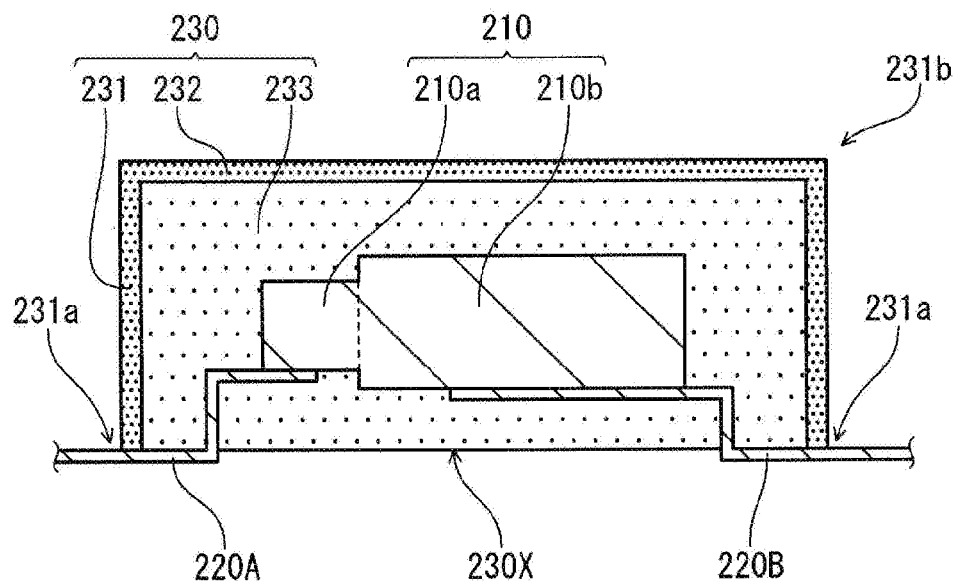
FIG. 8 A schematic cross-sectional view of an electrolytic capacitor according to a first embodiment of a second mode of the present invention.

An example of the present embodiment, an electrolytic capacitor 200A, is shown in FIG. 8.

A capacitor element 210 has an anode part 210a and a cathode part 210b. The anode part 210a comprises an anode body, to which an anode lead terminal 220A is connected. The cathode part 210b includes a cathode layer, to which a cathode lead terminal 220B is connected.

The capacitor element 210 is covered with a packaging member 230. The packaging member 230 includes a side wall 231, a ceiling 232, and a sealing resin 233. The ceiling 232 is disposed opposite to a bottom face 230X of the electrolytic capacitor 200A.

The sealing resin 233 is filled between the capacitor element 210 and the side wall 231. The capacitor element 210 is covered from all sides with the sealing resin 233. The outer peripheral surface of the sealing resin 233 is partially covered by the side wall 231 and the ceiling 232. From the remaining outer peripheral surface of the sealing resin 233, the anode lead terminal 220A and the cathode lead terminal 220B (hereinafter sometimes collectively referred to as "lead terminal 220") are partially exposed. In other words, the bottom face 230X is formed of the sealing resin 233.

The sealing resin 233 is electrically non-conductive and includes, for example, a hardened material of thermosetting resin. Examples of the thermosetting resin include epoxy resin, phenol resin, silicone resin, melamine resin, urea resin, alkyd resin, polyurethane, polyimide, polyamide-imide, and unsaturated polyester. The sealing resin 233 can reduce permeation of oxygen and water into the electrolytic capacitor. Thus, the deterioration of the capacitor element can be prevented, and the heat insulating properties thereof can be improved.

The bottom face 230X may be provided with a protective layer having low permeability to at least one of oxygen and water, at a region where the lead terminal 220 is not exposed. The electrolytic capacitor 200A may be provided with, near the bottom face 230X, a bottom member (not shown) that is electrically non-conductive and has an opening capable of inserting the lead terminal 220 therethrough. In this case, the bottom face 230X is formed of the bottom member. To enhance the adhesion with the sealing resin 233, the inner surfaces of the side wall 231 and the ceiling 232 and the surface of the lead terminal 220 may be roughened.

The side wall 231 and the ceiling 232 are integrally formed by, for example, integral molding. The ceiling 232 may be replaced with a lid member (not shown) which is a separate member from the side wall 231. In other words, the packaging member 230 may include the side wall 231, the sealing resin 233, and the lid member disposed near a second end 231b of the side wall 231, the end being opposite a first end 231a of the side wall 231 near the bottom face 230X. The lid member may or may not be electrically conductive.

Any material may be used as the conductive lid member. For example, a metal material can be used. Examples of the metal material include aluminum, titanium, tantalum, iron, copper, zinc, nickel, molybdenum, tungsten, and composites of these materials. Since the lid member of the packaging member contains a metal material, permeation of oxygen and water into the electrolytic capacitor can be reduced, and deterioration of the capacitor element can be prevented. Examples of the material of the non-conductive lid member include those mentioned as examples of the material of the side wall.

The lead terminal 220 and the end face of the side wall 231 facing the bottom face 230X may not be flush with each other. In other words, when the electrolytic capacitor is mounted on an electronic component, although the lead terminal 220 contacts the electronic component, the packaging member 230 may not contact the electronic component.

Embodiment II-2

Figure 9:
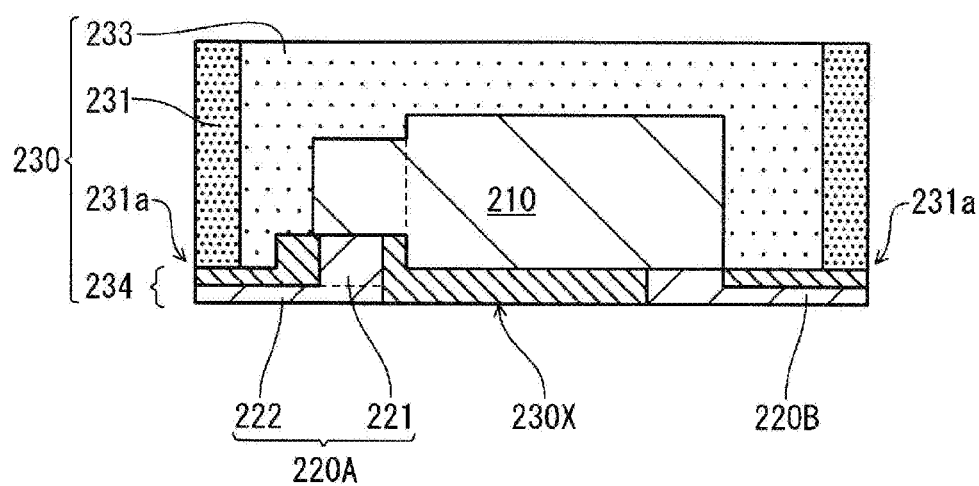
FIG. 9 A schematic cross-sectional view of an electrolytic capacitor according to a second embodiment of the second mode of the present invention.

An example of the present embodiment, an electrolytic capacitor 200B, is shown in FIG. 9.

The electrolytic capacitor 200B lacks the ceiling 232, and instead is provided with a bottom member 234 that is electrically non-conductive. In other words, the packaging member 230 includes the side wall 231, the sealing resin 233, and the bottom member 234 disposed near the first end 231a of the side wall 231. The anode lead terminal 220A includes a first portion 221 connected to the anode part 210a, and a second portion 222 exposed from the bottom face 230X. The first portion 221 and the second portion 222 are housed in the bottom member 234. The bottom face 230X is formed of the bottom member 234. Except these, the electrolytic capacitor 200B is configured similarly to the electrolytic capacitor 200A.

The bottom member 234 may be a ceramics multilayer printed circuit board produced by, for example, the HTCC (High Temperature Co-fired Ceramics) technology or the LTCC (Low Temperature Co-fired Ceramics) technology.

The first portion 221 of the anode lead terminal 220A may not be housed in the bottom member 234. The first portion 221 may be a separate member from the second portion 222 (bottom member 234). In this case, the first portion 221 can be designed more freely in shape and size. This allows the use of various shapes and sizes of the capacitor elements 210.

The thickness of the bottom member 234 is, for example, 0.1 mm or more and 1 mm or less, but not limited thereto. The thickness may be 0.1 mm or more and 0.5 mm or less.

The bottom member 234 is joined to the side wall 231. The joining is performed by, for example, using adhesive or low-melting glass, soldering, or brazing. When soldering or brazing is used for joining, for example, metal patterns are formed in advance on the bottom member 234 and the side wall 231 at positions where they correspond to each other. The bottom member 234 and the side wall 231 may be integrally formed. A ceiling (lid member) may be provided as a separate member.

Embodiment II-3

Figure 10A:
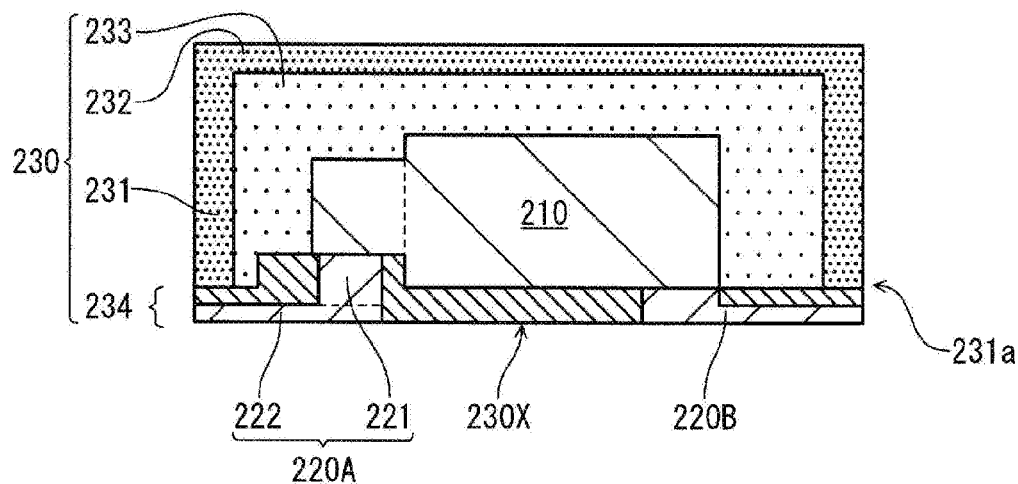
FIG. 10A A schematic cross-sectional view of an electrolytic capacitor according to a third embodiment of the second mode of the present invention.

An example of the present embodiment, an electrolytic capacitor 200C, is shown in FIG. 10A.

The electrolytic capacitor 200C is configured similarly to the electrolytic capacitor 200B, except for including a ceiling 232 integrated with the side wall 231. In other words, the packaging member 230 includes the side wall 231, the ceiling 232 integrated with the side wall 231, the sealing resin 233, and the bottom member 234, with the first and second portions 221 and 222 of the anode lead terminal 220A housed in the bottom member 234. The bottom face 230X is formed of the bottom member 234.

Figure 10B:
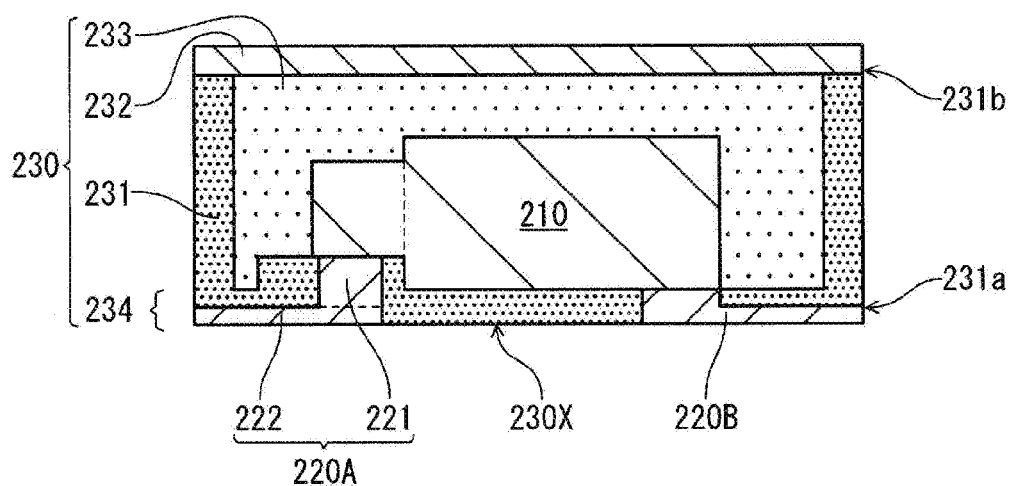
FIG. 10B A schematic cross-sectional view of another electrolytic capacitor according to the third embodiment of the second mode of the present invention.

The side wall 231 and the ceiling 232 may be separate members, while the side wall 231 and the bottom member 234 may be integrated. In other words, like in an electrolytic capacitor 200D of FIG. 10B, the packaging member 230 includes: the side wall 231; the lid member 232 which is a separate member from the side wall 231, disposed near the second end 231b of the side wall 231 opposite the first end 231a; the sealing resin 233; and the bottom member 234 integrated with the side wall 231, disposed near the first end 231a of the side wall 231. The lid member 232 may or may not be electrically conductive. The lid member 232 as a separate member may not be provided.

Figure 10C:
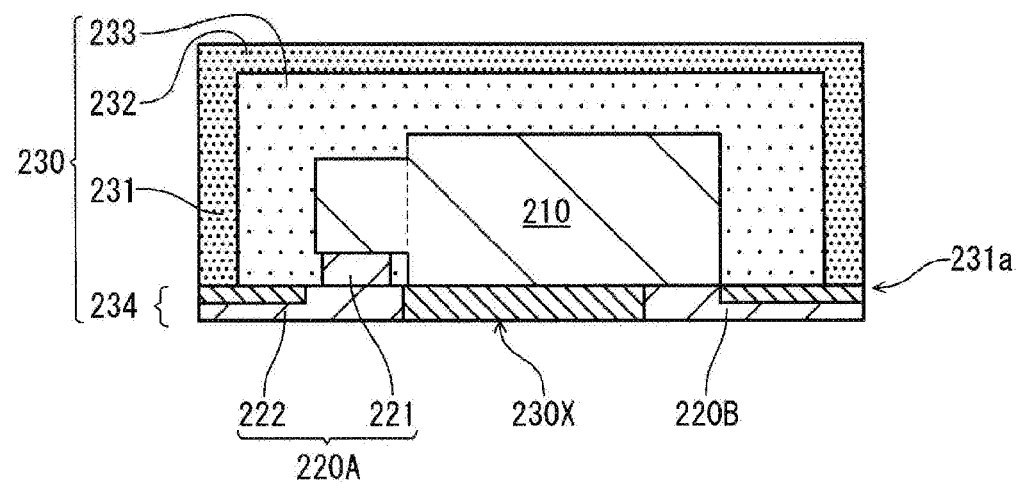
FIG. 10C A schematic cross-sectional view of yet another electrolytic capacitor according to the third embodiment of the second mode of the present invention.

The first portion 221 of the lead terminal 220, like in an electrolytic capacitor 200E of FIG. 10C, may not be housed in the bottom member 234. The first portion 221 and the second portion 222 (bottom member 234) may be separate members. In this case, the first portion 221 can be designed more freely in shape and size. This allows the use of various shapes and sizes of the capacitor elements 210.

The gap between the capacitor element 210 and the side wall 231 may be charged with atmospheric or inert gas, instead of the sealing resin 233. The gap between the capacitor element 210 and the side wall 231 may be in a reduced-pressure state.

Embodiment II-4

In the present embodiment, the packaging member includes a bottom member, and the bottom member includes a first step portion that fits the first end of the side wall near the bottom face. This configuration can improve the assembling precision of the packaging member 230.

Figure 11A:
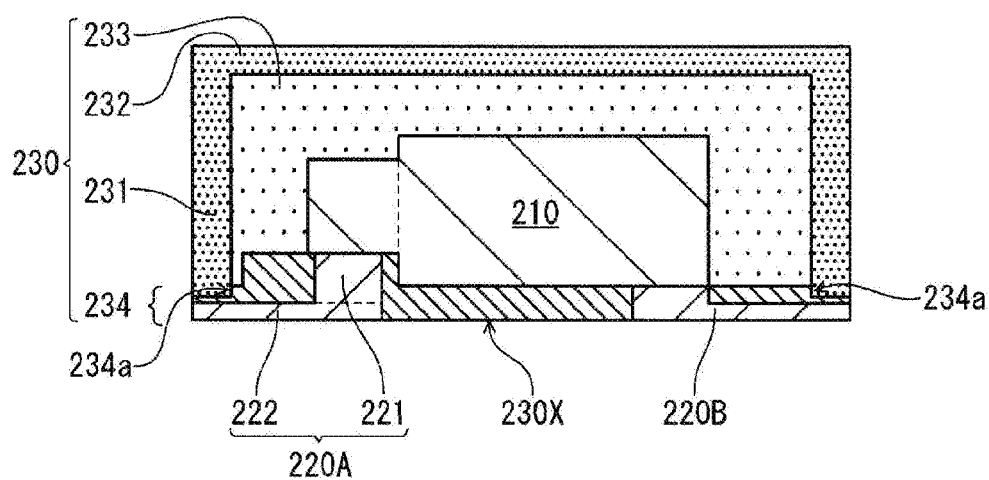
FIG. 11A A schematic cross-sectional view of an electrolytic capacitor according to a fourth embodiment of the second mode of the present invention.

An example of the present embodiment, an electrolytic capacitor 200F, is shown in FIG. 11A.

The electrolytic capacitor 200F is configured similarly to the electrolytic capacitor 200C, except that the bottom member 234 has a first step portion 234a.

Figure 11B:
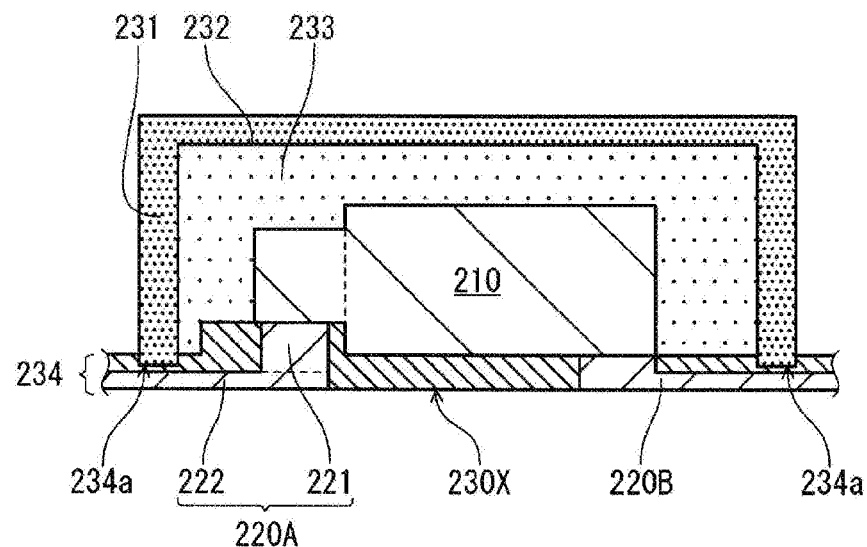
FIG. 11B A schematic cross-sectional view of another electrolytic capacitor according to the fourth embodiment of the second mode of the present invention.

The first step portion 234a may be shaped like a groove, as in an electrolytic capacitor 200G of FIG. 11B. The electrolytic capacitor 200G is configured similarly to the electrolytic capacitor 200F, except the shape of the first step portion.

Embodiment II-5

In the present embodiment, the lid member includes a second step portion that fits the second end of the side wall opposite the first end. This configuration can also improve the assembling precision of the packaging member 230.

Figure 12A:
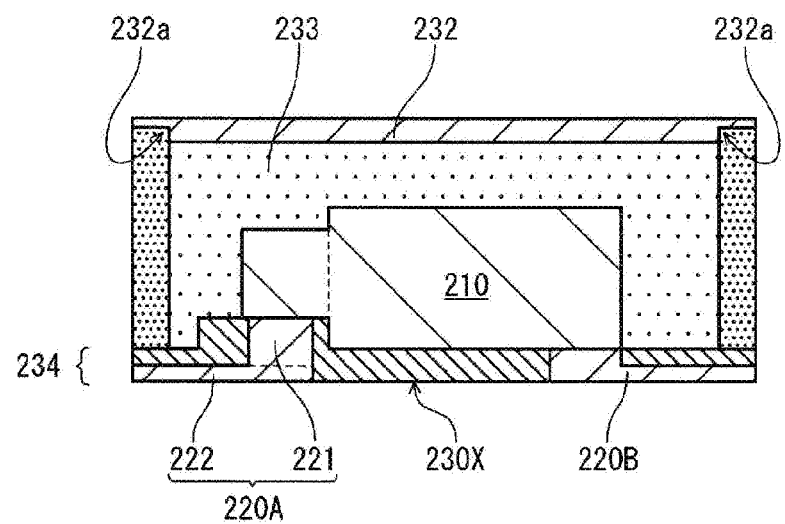
FIG. 12A A schematic cross-sectional view of an electrolytic capacitor according to a fifth embodiment of the second mode of the present invention.

An example of the present embodiment, an electrolytic capacitor 200H, is shown in FIG. 12A.

The electrolytic capacitor 200H is configured similarly to the electrolytic capacitor 200C, except that the side wall 231 and the bottom member 234 are separate members, and the lid member 232 has a second step portion 232a.

Figure 12B:
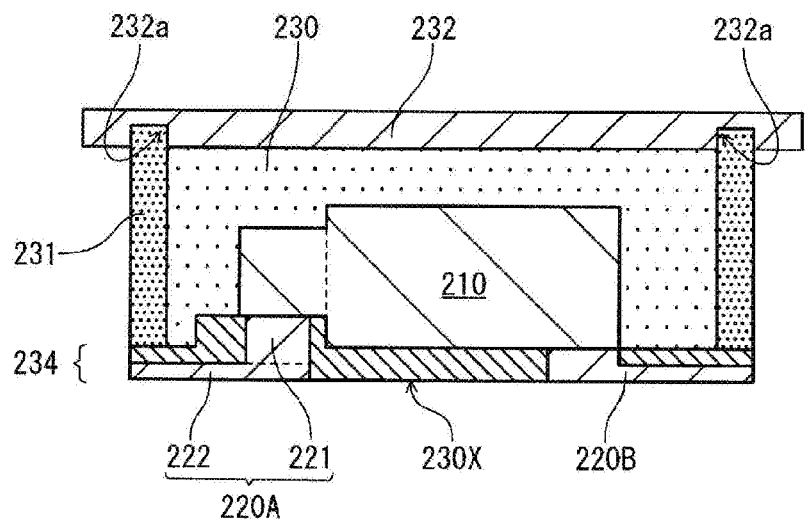
FIG. 12B A schematic cross-sectional view of another electrolytic capacitor according to the fifth embodiment of the second mode of the present invention.

The second step portion 232a, like in an electrolytic capacitor 200I of FIG. 12B, may be shaped like a groove. The electrolytic capacitor 200I is configured similarly to the electrolytic capacitor 200H, except the shape of the second step portion.

Figure 12C:
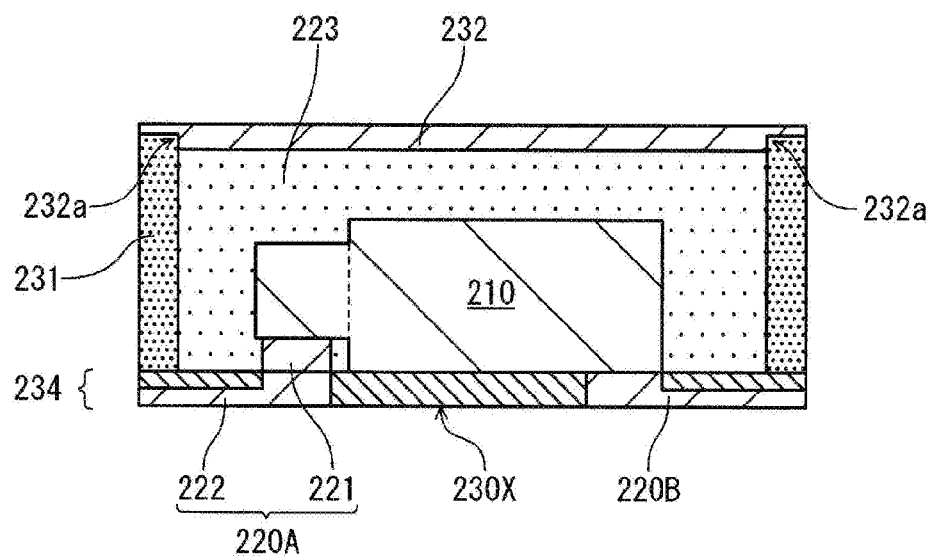
FIG. 12C A schematic cross-sectional view of another electrolytic capacitor according to the fifth embodiment of the second mode of the present invention.

The first portion 221 of the anode lead terminal 220A, like in an electrolytic capacitor 200J of FIG. 12C, may not be housed in the bottom member 234. Also, the first portion 221 may be a separate portion from the bottom member 234. The electrolytic capacitor 200J is configured similarly to the electrolytic capacitor 200H, except the anode lead terminal 220A.

Next, the capacitor element and the lead terminal common to the first and second modes will be described with reference to the appended drawings.

(Capacitor Element)

The capacitor element has an anode part and a cathode part.

Figure 13:
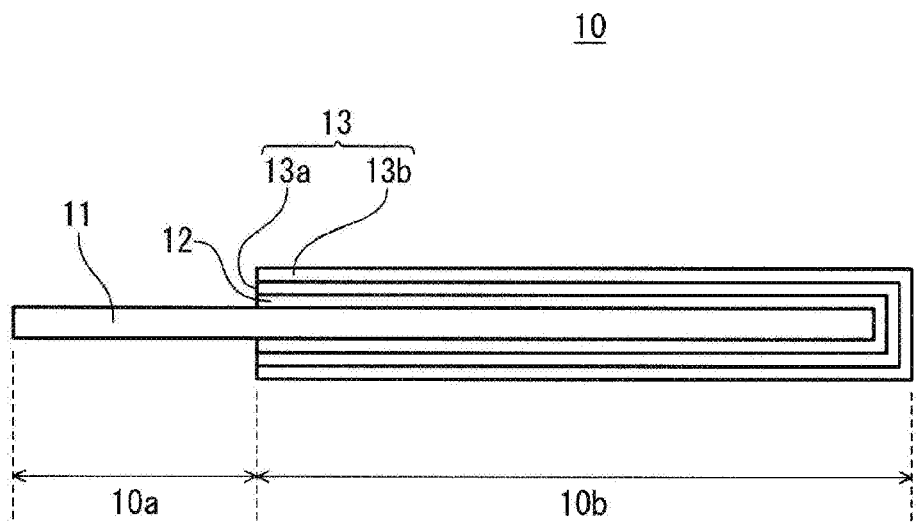
FIG. 13 A schematic cross-sectional view of a capacitor element according to an embodiment of the present invention.

As shown in FIG. 13, an anode part 10a comprises a part of an anode body 11. A cathode part 10b comprises a remaining part of the anode body 11, a dielectric layer 12 formed on at least part of the surface of the anode body 11, and a cathode layer 13 formed on at least part of the surface of the dielectric layer 12. The cathode layer 13 has a solid electrolyte layer 13a formed on at least part of the dielectric layer 12, and a cathode leading layer 13b formed on at least part of the solid electrolyte layer 13a. The capacitor element 10 is, for example, sheet-like or flat plate-like in shape.

(Anode Body)

The anode body 11 includes, as an electrically conductive material, a foil (metallic foil) containing a valve metal or a porous sintered body containing a valve metal. An anode wire is embedded in the porous sintered body, with one end extending from the body. The anode wire is used for connection with the anode lead terminal. Examples of the valve metal include titanium, tantalum, aluminum, and niobium. The anode body 11 may contain one or two or more kinds of the above valve metals. The anode body 11 may contain the valve metal in the form of, for example, an alloy containing the valve metal, or a compound containing the valve metal. The thickness of the anode body 11 being a metal foil is, for example, 15 µm or more and 300 µm or less, but not limited thereto. The thickness of the anode body 11 being a porous sintered body is, for example, 15 µm or more and 5 mm or less, but not limited thereto.

(Dielectric Layer)

The dielectric layer 12 is formed by, for example, anodizing the surface of the anode body 11 by chemical treatment. The dielectric layer 12, therefore, can possibly contain an oxide of the valve metal. For example, when aluminum is used as the valve metal, the dielectric layer 12 can possibly contain $Al_2O_3$. The dielectric layer 12 is not limited to this configuration, and may have any configuration that functions as a dielectric.

(Cathode Layer)

The cathode layer 13 has, for example, the solid electrolyte layer 13a covering the dielectric layer 12, and the cathode leading layer 13b covering the solid electrolyte layer 13a.

The solid electrolyte layer 13a is only required to cover at least part of the dielectric layer 12, and it may be formed so as to cover the entire surface of the dielectric layer 12.

As the solid electrolyte layer 13a, for example, a manganese compound or an electrically conductive polymer can be used. Examples of the conductive polymer include polypyrrole, polyaniline, polythiophene, polyacetylene, and derivatives of these materials. The solid electrolyte layer 13a containing the conductive polymer can be formed by, for example, subjecting a raw material monomer to chemical polymerization and/or electrolytic polymerization on the dielectric layer. Alternatively, it can be formed by applying a solution in which the conductive polymer is dissolved or a dispersion in which the conductive polymer is dispersed, onto the dielectric layer.

The cathode leading layer 13b is only required to cover at least part of the solid electrolyte layer 13a, and it may be formed so as to cover the entire surface of the solid electrolyte layer 13a.

The cathode leading layer 13b has, for example, a carbon layer, and a metal (e.g. silver) paste layer formed on the carbon layer. The carbon layer is configured of a composite containing an electrically conductive carbon material such as graphite. The metal paste layer is configured of, for example, a composite containing silver particles and resin. The cathode leading layer 13b is not limited to this configuration, and may have any configuration that has current collecting function.

(Lead Terminal)

The anode lead terminal is electrically connected to the anode part 10a (anode body 11) of the capacitor element 10. Any material can be used as the anode lead terminal, as long as it is electrochemically and chemically stable and has electrical conductivity. The material may be metal or non-metal. The shape of the anode lead terminal is also not limited. The thickness of the anode lead terminal (i.e., distance between the principal surfaces of the anode terminal) is, in terms of reducing the height, preferably 25 µm or more and 200 µm or less, and more preferably 25 µm or more and 100 µm or less.

The anode lead terminal may be electrically connected to the anode body 11 via, for example, electrically-conductive adhesive or solder. Alternatively, the anode lead terminal may be joined to the anode body 11 by, for example, resistance welding or laser beam welding. The conductive adhesive is, for example, a mixture of a thermosetting resin and carbon particles or metallic particles.

The cathode lead terminal is electrically connected to the cathode part 10b (cathode layer 13) of the capacitor element 10. Like the anode lead terminal, any material can be used as the cathode lead terminal, as long as it is electrochemically and chemically stable and has electrical conductivity. The material may be metal or non-metal. The shape of the cathode lead terminal is also not limited. The thickness of the cathode lead terminal is, in terms of reducing the height, preferably 25 µm or more and 200 µm or less, and more preferably 25 µm or more and 100 µm or less. The cathode lead terminal is electrically connected to the cathode layer 13 via, for example, an electrically-conductive adhesive.

The electrolytic capacitor may include a plurality of the capacitor elements 10.

Figure 14:
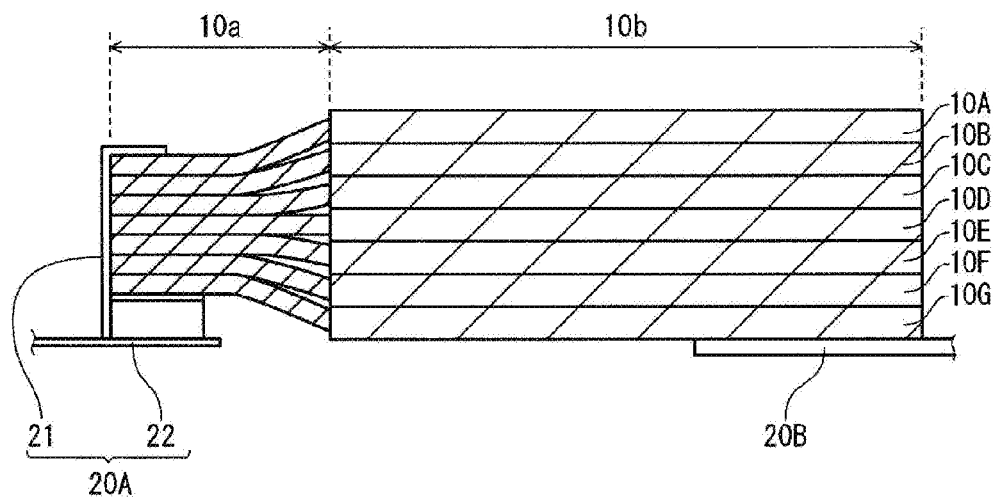
FIG. 14 A schematic cross-sectional view of stacked capacitor elements according to an embodiment of the present invention.

The capacitor elements 10 are stacked one on another. Capacitor elements 10A to 10G stacked together are shown in FIG. 14. The anode parts 10a of the stacked capacitor elements 10 are joined together by, for example, welding and/or clamping, and electrically connected to each other. The cathode parts 10b of the stacked capacitor elements 10 are also electrically connected to each other. The cathode lead terminal 20B is connected to at least one cathode layer of the capacitor elements 10. Although FIG. 14 shows seven capacitor elements 10 stacked together, the number of the capacitor elements 10 to be stacked is not limited.

For clamping the anode bodies 11, for example, an anode lead terminal 20A as shown in FIG. 14 is used.

The anode lead terminal 20A has a first portion 21 electrically connected to the anode body 11, and a flat plate-like second portion 22 disposed along the bottom face of the electrolytic capacitor and exposed from the packaging member. The anode lead terminal 20A is formed by, for example, bending a flat plate-like member, and the first portion 21 and the second portion 22 are connected to each other.

Figure 15A:
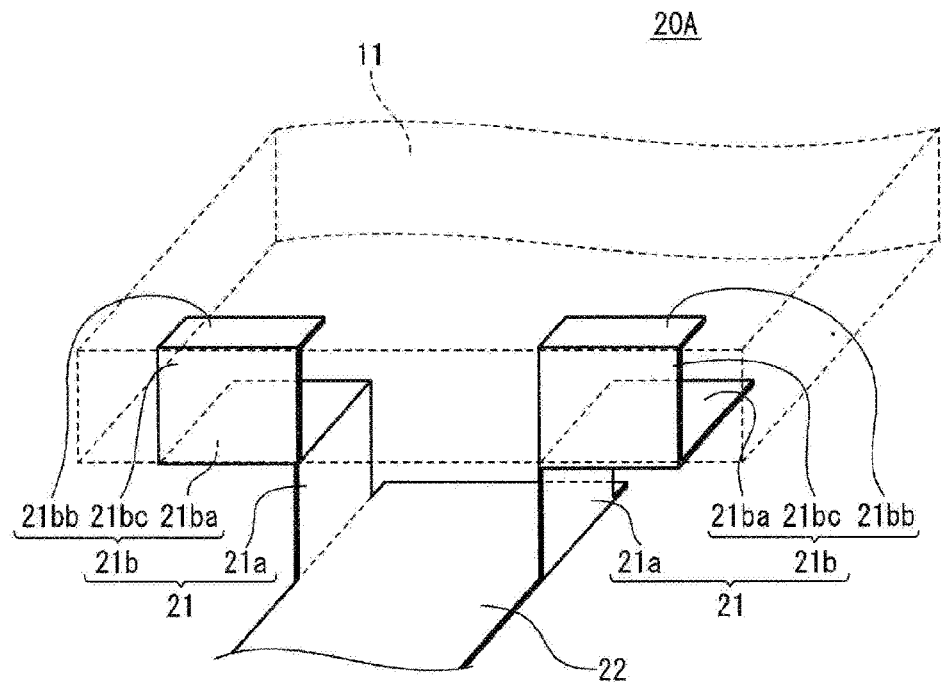
FIG. 15A A schematic oblique view of an anode lead terminal according to an embodiment of the present invention.
Figure 15B:
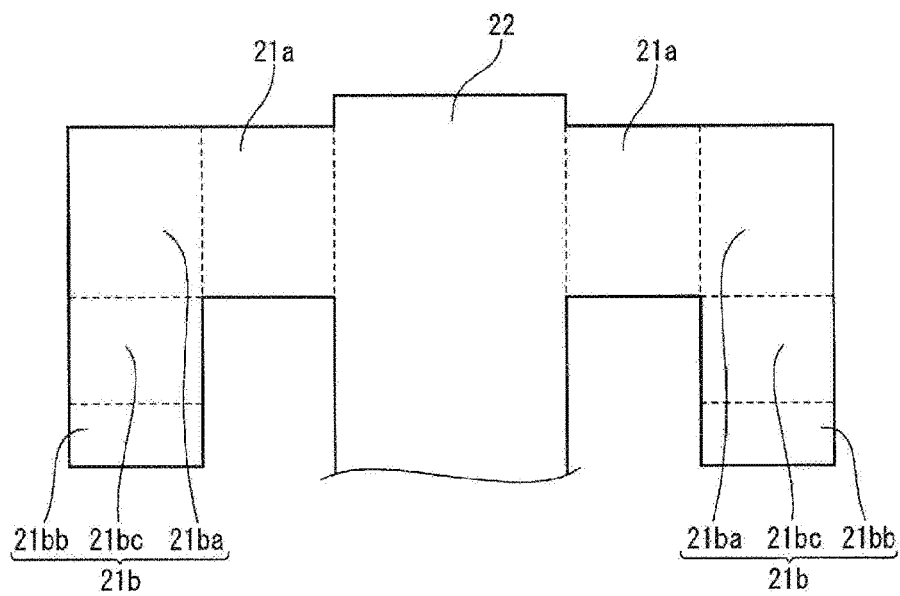
FIG. 15B An expanded view of the anode lead terminal of FIG. 15A.

FIG. 15A is a schematic oblique view of the anode lead terminal 20A of FIG. 14. FIG. 15B is an expanded view of the anode lead terminal 20A of FIG. 15A.

The first portion 21 has a standing part 21a that rises from the second portion 22 (the bottom face of the electrolytic capacitor) toward the anode body 11, and a sandwiching part 21b that sandwiches the anode 11. The first portion 21 may have a plurality of the sandwiching parts 21b. The sandwiching part 21b includes a first holding area 21ba and a second holding area 21bb that hold the stacked anode bodies 11 therebetween, and a connecting area 21bc that connects the first holding area 21ba to the second holding area 21bb.

The anode bodies 11 are held at a predetermined position between the first holding area 21ba and the second holding area 21bb. In this state, the sandwiching part 21b and the anode bodies 11 are laser welded together.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST 100A to 100G: Electrolytic capacitor
    110: Capacitor element
        110a: Anode part
        110b: Cathode part
    120: Lead terminal
        120A: Anode lead terminal
            121: First portion
            122: Second portion
        120B: Cathode lead terminal
    130: Packaging member
        130X: Bottom face
        131: Side wall
            131a: First end
            131b: Second end
        132: Ceiling
        133: Sealing resin
    140, 140A to 140F, 140EA to 140EF: Insulating member
        141 to 143: Opening
200A to 200J: Electrolytic capacitor
    210: Capacitor element
        210a: Anode part
        210b: Cathode part
    220: Lead terminal
        220A: Anode lead terminal
            221: First portion
            222: Second portion
        220B: Cathode lead terminal
    230: Packaging member
        230X: Bottom face
        231: Side wall
            231a: First end
            231b: Second end
        232: Ceiling (Lid member)
        233: Sealing resin
        234: Bottom member
10, 10A to 10G: Capacitor element
    10a: Anode part
    10b: Cathode part
        11: Anode body
        12: Dielectric layer
        13: Cathode layer
            13a: Solid electrolyte layer
            13b: Cathode leading layer
20: Lead terminal
    20A: Anode lead terminal
        21: First portion
            21a: Standing part
            21b: Sandwiching part
                21ba: First holding area
                21bb: Second holding area
                21bc: Connecting area
        22: Second portion
    20B: Cathode lead terminal

The invention claimed is:

1. An electrolytic capacitor comprising:
a capacitor element including an anode body, a dielectric layer formed on the anode body, a solid electrolyte layer formed on the dielectric layer, and a cathode layer formed on the solid electrolyte layer;
lead terminals each connected to the anode body and the cathode layer; and
a packaging member covering at least part of the capacitor element,
wherein the packaging member includes a side wall that is electrically conductive, and a bottom face, with at least one of the lead terminals partially exposed from the bottom face,
an insulating member is interposed between a first end of the side wall and the lead terminal exposed from the bottom face, the first end being near the bottom face,
the insulating member includes a plate-like member provided between the first end and the lead terminal exposed from the bottom face, the plate-like member having an inner face opposite to the bottom face,
the capacitor element has a first face opposed to the inner face of the plate-like member and a second face opposite to the first face and opposed to a top inner face of the packaging member, the second face of the capacitor element being closer to the top inner face of the packaging member than the inner face of the plate-like member,
the lead terminal exposed from the bottom face includes a first portion connected to the anode body or the cathode layer, and a second portion exposed from the bottom face, and
the second portion is housed in the plate-like member.

2. The electrolytic capacitor of claim 1, wherein the plate-like member has an opening for passing through the lead terminal exposed from the bottom face from inside the packaging member to outside the bottom face.

3. The electrolytic capacitor of claim 2, wherein the opening is a slit-like opening.

4. The electrolytic capacitor of claim 2, wherein the opening has no open part.

5. The electrolytic capacitor of claim 2, wherein the plate-like member has two or more of the opening.

6. The electrolytic capacitor of claim 1, wherein the packaging member includes a lid member provided near a second end of the side wall, the second end being opposite the first end.

7. The electrolytic capacitor of claim 6, wherein the lid member has electrical conductivity.

8. The electrolytic capacitor of claim 6, wherein the lid member has electrical non-conductivity.

9. The electrolytic capacitor of claim 1, wherein the packaging member includes a sealing resin filled between the capacitor element and the side wall.

10. The electrolytic capacitor of claim 9, wherein the side wall has a roughened inner surface.

11. The electrolytic capacitor of claim 9, wherein the lead terminal has a roughened surface.

12. The electrolytic capacitor of claim 1, wherein the plate-like member is made thin at a region where the plate-like member overlaps the lead terminal.

\* \* \* \* \*